United States Patent [19]

Romey et al.

[11] 4,259,473

[45] Mar. 31, 1981

[54] PROCESS FOR MAKING SELF-CURING OR CURABLE MATERIALS FROM COAL HYDROGENATION DISTILLATE RESIDUES

[75] Inventors: Ingo Romey, Hünxe, Fed. Rep. of Germany; Menachem El-Roy, Haifa, Israel

[73] Assignee: Bergwerksverband GmbH, Essen, Fed. Rep. of Germany

[21] Appl. No.: 112,227

[22] Filed: Jan. 15, 1980

[30] Foreign Application Priority Data

Jan. 15, 1979 [DE] Fed. Rep. of Germany ....... 2901405

[51] Int. Cl.$^3$ .................. C08G 8/10; C08G 8/20; C08G 8/22; C08G 10/02
[52] U.S. Cl. .................. 528/138; 528/137; 528/139; 528/143; 528/144; 528/147; 528/153; 528/238; 528/241; 528/247
[58] Field of Search ............... 528/137, 138, 139, 153, 528/144, 247, 238, 241

[56] References Cited

U.S. PATENT DOCUMENTS

| | | | |
|---|---|---|---|
| 2,289,478 | 7/1942 | Brown | 528/143 |
| 2,460,724 | 2/1949 | Allen et al. | 528/143 X |
| 2,487,309 | 11/1949 | Champagnati et al. | 528/143 X |
| 3,188,301 | 6/1965 | Roberts et al. | 528/139 |
| 4,187,369 | 2/1980 | Pavlikov et al. | 528/137 X |

*Primary Examiner*—Howard E. Schain
*Attorney, Agent, or Firm*—Michael J. Striker

[57] ABSTRACT

Self-curing or curable materials are obtained from the distillation residues of coal hydrogenation by condensing a residue of this type having a softening point of 30° to 54° C. in a first stage with a mono- or dihydroxybenzene and/or a methylhydroxybenzene and/or an ethylene substituted benzene. These reactants are used at a ratio of residue to benzene derivative between 1:1 and 2:1 and the reaction is carried out in the presence of acid at a pH of 1 to 2 and at a temperature of 90° to 100° C. In a second stage the thus obtained reaction product is then further reacted at about the same temperature with an aldehyde. As a result a novolak-type resin is obtained. The invention permits the making of inexpensive self-curing or curable materials with properties similar to those of phenolic acids. Besides, the invention also provides an outlet for the high boiling residue of the extractive coal hydrogenation which otherwise had little use.

9 Claims, No Drawings

PROCESS FOR MAKING SELF-CURING OR CURABLE MATERIALS FROM COAL HYDROGENATION DISTILLATE RESIDUES

BACKGROUND OF THE INVENTION

The invention relates to a process for making self-curing or curable materials from distillation residues obtained in the hydrogenation of coal.

The invention is based on the condensation of the residues that occur in the extractive hydrogenation of coal and which are obtained by distilling off the low boiling components.

A process is already known whereby thermosetting materials may be obtained in this manner which have properties comparable to those of the resins from the group of phenolic plastics. In the known process there was formed a derivative by condensation of the residue with a phenol which product was then reacted in a second stage with formaldehyde resulting in a novolak-type resin. The initial hydrogenation product in this process was an extract which was formed by the hydrogenation of coal or lignite at a pressure of 50 to 80 bar and a temperature of 370° to 390° C. The softening point of this extract was at 100° to 120° C.

The acid condensation with phenol in this process was carried out in the presence of only 0.2% of hydrochloric acid of a density of 1.19 g/cm$^3$ and 0.1% hydrogen iodide and a temperature of 100° C. was observed. The ratio in the mixture of extract to phenol was about 1:2. The insoluble components of the resin in this process were not removed prior to the condensation. Rather, the second stage of the reaction with formaldehyde was then carried out with the entire mass obtained.

The thus produced novalak resin could be hardened by addition of at most 10% hexanmethylenetetramine and at a temperature of 180° C. The shortcoming of this process was that a high melting point extraction residue had to be reacted with a large amount of phenol, but only a catalytic amount of acid. It was not possible in this manner to obtain an inexpensive product (Bronowetz and Taits, Chemie der festen Brennstoffe 1 (1970), pages 86–94, UDSSR). It was also known to obtain a polycondensation resin from a low temperature crude tar derived from coal and lignite after removal of the solid paraffins followed by a two-stage condensation with Formalin at 90° C. in the presence, in the first stage, of hydrochloric acid, and in the second stage of ammonia. The condensation thus was effected in absence of phenol and actually had not the object to obtain a hardenable product (UDSSR-Patent No. 148 237).

Both processes, besides, did not have the objective to produce an industrially valuable resin or moldable material.

It was furthermore known to extend or dilute epoxy resin and phenolic plastics with tars from the petroleum distillation for the purpose to reduce the price of the resins. In this manner there were for instance made floorings, impregnating materials, etc. In all these mixtures the tar served only as a diluent or filler (UDSSR-Patent No. 419 542, Veba Chemie Corporation, Product-Information 22-D-169-2-4).

The present invention, therefore, has the object to obtain an inexpensive thermosetting moldable material from the residues of the extractive coal hydrogenation.

ESSENCE OF THE INVENTION

This object is solved in the invention by condensing the residues obtained from an extractive coal hydrogenation which have a softening point of 30° to 54° C. according to DIN No. 1995 (German Industrial norms) in a first stage with a mono- or di-hydroxybenzene and-/or methylhydroxybenzene and/or ethylene substituted benzene. The mixture of extract and benzene derivative is used at a ratio of 1:1 to 2:1 and the reaction is carried out in the presence of an acid at a pH of 1 to 2 and at a temperature of 90° to 100° C. In a second stage the condensation product is reacted with an aldehyde at about the same temperature resulting in the formation of a novolak-type resin. The condensation of the distillation residues of the coal hydrogenation which have a low softening point surprisingly takes place in an easy manner with phenol or resorcinol, but can also be carried out with cresol or styrene as well as bisphenol A. The inventor has found also that this condensation of the extract with phenols or cresols, etc. proceeds in a particularly easy manner at a mixture ratio of extract to phenol between 1:1 and 2:1. The significance of this ratio is that according to the invention a much higher proportion of extract such as at least 30 to 70% can be subjected to the condensation. The condensation temperature should be between 90° and 100° C.

The pH value of the acid condensation should be between 1 and 2. Along with the usual inorganic mineral acids such as hydrochloric acid it is possible also to use organic acids such as oxalic acid. Preferably, the inorganic inert materials are removed from the extract prior to the condensation.

According to an embodiment of the invention the residue from the coal hydrogenation having the softening point as defined above may also be reacted in the first stage with hydroxyl groups containing extract distillates as condensation component. This embodiment is particularly advantageous where the extract distillate contains phenols.

The condensation reaction proceeds in particularly desirable manner if there are added 1 to 2% of a Lewis acid, for instance $BF_3$, $AlCl_3$, etc. as a catalyst.

In the second stage and at the same temperature as in the first stage a novolak-type resin is formed by reaction with an aldehyde. Useful aldehydes are, for instance, Formalin, paraformaldehyde, furfural, etc. The reaction time with the Formalin is somewhat longer than with the other mentioned aldehydes.

In a somewhat different proceeding it is also possible to carry out an alkaline condensation with an aldehyde in the first stage followed by a condensation with a phenol in the second stage. The extract in this case is first reacted with Formalin or paraformaldehyde in the presence of a basic catalyst such as sodium hydroxide or potassium hydroxide and, if desired, also magnesium oxide at a temperature of about 60° C. There then follows a second stage condensation with a monohydroxy or dihydroxybenzene at about the same temperature. This variation of the process results in resole-type resins.

The hydrogenation residue in these cases is obtained by liquefying coal at pressure of about 100 to 700 bar and at temperatures of about 400° to 500° C. The process is usually carried out in the presence of a catalyst. In this process the initial material is a coal which normally is ground with a heavy oil to a particle size lower than 200μ. Depending on the desired composition of the residue from the hydrogenation it may be useful to add more or less hydrogen either as a gas or in the form of a hydrogen releasing heavy oil. The higher the proportion of hydrogen is, the larger will be the amount of low boiling residues from the coal hydrogenation.

The range of products obtained from the hydrogenation comprises a number of different hydrocarbons with increasing boiling points starting usually from methane and leading to low boiling point oils up to high boiling point oils and insoluble coal components as well as minerals (ash).

Reference is made in this connection to the well known coal hydrogenation processes such as the Bergius-Pier and the Pott-Broche-process. The process of the invention leads not only to an inexpensive self-curing or curable material with properties similar to those of the phenolic resins. It also provides an outlet for the high boiling point residues of the extractive coal hydrogenation which heretofore were of little use because of the difficulty to handle them.

PREFERRED EMBODIMENTS OF THE INVENTION

The process of the invention will be illustrated in the following examples.

EXAMPLE 1

100 parts by weight of a residue of the coal hydrogenation having a softening point of 30° C. (determined according to DIN 1995 were heated to about 90° C. and then stirred at 90° C. for about 90 minutes with a mixture consisting of 80 parts by weight of cresol, 10 parts by weight of hydrochloric acid of a density of 1.19 g/cm$^3$ and 5 parts by weight of oxalic acid. The mixture was then left for another 60 minutes at the previous temperature whereupon 35 parts by weight of paraldehyde were added. After another 45 to 60 minutes a marked increase in the viscosity occurred. The material was then subjected to drying. After cooling a novolak-type resin was obtained.

This resin was hardened in conventional manner with 10 parts by weight of hexamethylenetetramine at 160° C.

EXAMPLE 2

2.5 parts by weight of dry aluminum chloride were added upon stirring at 95° C. to 100 parts by weight of a filtered distillation residue of the coal hydrogenation which had a softening point determined according to DIN 1995 of 50° C. Thereafter there were further added 30 parts by weight of styrene in a period of 15 minutes. This mixture was then stirred for another 45 minutes at a temperature of 100° C. during which period there were added 15 parts by weight of Formalin (38%) and 0.2% of "Nekal", a sodium alkyl naphthalene sulfonate. Thereafter the mixture was heated to 100° C. until an increase in the viscosity occurred. The formed resin had a softening point of 80° C.

The aqueous solution was separated and the resin was dried at a vacuum of 13.3 mbar.

The thus obtained final resin was cured by addition of hexamethylenetetramine as in Example 1 at 160° C.

EXAMPLE 3

This example illustrates the modification of the process of the invention above mentioned.

100 parts by weight of a residue from the hydrogenation of coal having a softening point of 54° C. (DIN 1995) and 100 parts by weight of a 38% solution of formalin were stirred for 1 hour at 60° C. together with 85 parts by weight of a 15% concentration of sodium hydroxide and 1 part by weight of magnesium oxide. There were then added 50 parts by weight of cresol and stirring was continued at 60° C. for another 4 hours. The reaction mass was then washed with warm water and dried at a vacuum of 26.3 mbar. The resulting resin could be cured by heating to about 100° C. after addition of oxalic acid.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for making self-curing or curable materials from coal hydrogenation distillation residues, the said process comprising
    subjecting the residue of an extractive coal hydrogenation which has a softening point of 30° to 54° C., in a first stage to condensation with a mono- or dihydroxybenzene and/or a methylhydroxybenzene and/or an ethylene substituted benzene, the reactants being present at a ratio of the residue to benzene derivative between 1:1 and 2:1 and the reaction being carried out in the presence of acid at a pH of 1 to 2 and at a temperature of 90° to 100° C. whereupon, in a second stage, the condensation product of the first stage is reacted at about the same temperature range with an aldehyde whereby a novolak-type resin is obtained.

2. The process of claim 1 wherein the residue from the coal hydrogenation is subjected to filtration prior to said first stage condensation reaction.

3. The process of claim 1 wherein the residue from the coal hydrogenation is reacted in said first stage with hydroxyl groups containing extract distillate as condensation component.

4. The process of claim 1 wherein the residue in the first stage is reacted with bisphenol A as condensation component.

5. The process of claim 1 wherein the residue is reacted in the first stage with a phenol or resorcinol as condensation component.

6. The process of claim 1 wherein the acid in said first stage is hydrochloric acid and/or oxalic acid.

7. The process of claim 1 wherein the acidic condensation in said first stage is effected in the presence of 1 to 2% of a Lewis acid as catalyst, the said amount being relative to the total condensation mixture.

8. The process of claim 7 wherein the Lewis acid is BF$_3$ or AlCl$_3$.

9. The process of claim 1 wherein the aldehyde is formaldehyde or furfural.

* * * * *